US012122606B2

(12) United States Patent
Schill et al.

(10) Patent No.: US 12,122,606 B2
(45) Date of Patent: Oct. 22, 2024

(54) GRAIN CONVEYOR CHAIN

(71) Applicant: IWIS Antriebssysteme Gmbh & Co. KG, Munich (DE)

(72) Inventors: Eric Schill, Niederdorla (DE); Jaymin Patel, Karlsfeld (DE)

(73) Assignee: Iwis antriebssysteme GmbH & Co. KG, Munich (DE)

( * ) Notice: Subject to any disclaimer, the term of this patent is extended or adjusted under 35 U.S.C. 154(b) by 0 days.

(21) Appl. No.: 17/827,274

(22) Filed: May 27, 2022

(65) Prior Publication Data

US 2023/0002164 A1 Jan. 5, 2023

Related U.S. Application Data

(60) Provisional application No. 63/168,754, filed on Mar. 31, 2021.

(51) Int. Cl.
| | |
|---|---|
| *B65G 19/24* | (2006.01) |
| *A01D 61/04* | (2006.01) |
| *A01F 12/46* | (2006.01) |
| *B65G 17/42* | (2006.01) |
| *B65G 17/12* | (2006.01) |
| *B65G 17/36* | (2006.01) |
| *B65G 17/44* | (2006.01) |

(52) U.S. Cl.
CPC ............. *B65G 19/24* (2013.01); *A01D 61/04* (2013.01); *A01F 12/46* (2013.01); *B65G 17/42* (2013.01); *B65G 17/126* (2013.01); *B65G 17/36* (2013.01); *B65G 17/44* (2013.01); *B65G 2201/042* (2013.01)

(58) Field of Classification Search
CPC ...... B65G 19/24; B65G 17/42; B65G 17/126; B65G 17/36; B65G 17/44; B65G 2201/042; B65G 19/08; A01D 61/04; A01F 12/46
USPC .......................................... 198/801, 716, 711
See application file for complete search history.

(56) References Cited

U.S. PATENT DOCUMENTS

| | | | | |
|---|---|---|---|---|
| 3,927,759 | A | * 12/1975 | Hyler ...................... | E02F 3/143 198/719 |
| 4,663,042 | A | * 5/1987 | Rasper ............... | B01D 21/2472 198/734 |
| 4,950,398 | A | * 8/1990 | Wiegand ................ | B01D 21/18 210/232 |
| 5,000,310 | A |   3/1991 | Edmonson et al. | |

(Continued)

FOREIGN PATENT DOCUMENTS

| | | |
|---|---|---|
| CN | 2637415 Y | 9/2004 |
| DE | 202014010472 U1 * 12/2015 | ........... A01D 45/023 |

(Continued)

OTHER PUBLICATIONS

EPO, Patent Translate Description EP 1298077 (Year: 2023).*

(Continued)

*Primary Examiner* — Mark A Deuble
(74) *Attorney, Agent, or Firm* — Henry M. Feiereisen LLC

(57) ABSTRACT

A grain conveyor chain for a harvesting vehicle includes a chain made of standard chain elements and multiple scoops. The scoops are fastened on the chain and the standard chain elements have inner plates, outer plates, pins, and/or sleeves, with each scoop being in direct contact with a standard chain element.

18 Claims, 5 Drawing Sheets

(56) References Cited

U.S. PATENT DOCUMENTS

| | | | | |
|---|---|---|---|---|
| 5,165,522 A * | 11/1992 | Uttke | ............ | B65G 19/22 |
| | | | | 198/731 |
| 5,341,919 A * | 8/1994 | Mizuno | ............ | B65G 19/14 |
| | | | | 198/716 |
| 5,429,226 A * | 7/1995 | Ensch | ............ | B65G 17/44 |
| | | | | 198/803.14 |
| 6,851,549 B1 * | 2/2005 | Beringer | ............ | B65G 17/32 |
| | | | | 198/803.14 |
| 8,016,103 B2 * | 9/2011 | Krischer | ............ | B65G 17/44 |
| | | | | 198/853 |
| 10,131,501 B1 * | 11/2018 | Kopf | ............ | A01F 12/46 |
| 10,462,973 B2 * | 11/2019 | Dilts | ............ | B65G 17/126 |
| 11,945,654 B2 * | 4/2024 | Schill | ............ | B65G 19/24 |

FOREIGN PATENT DOCUMENTS

| | | | | |
|---|---|---|---|---|
| EP | 1298077 A2 * | 4/2003 | ............ | A01F 12/46 |
| GB | 1 523 313 A | 8/1978 | | |
| JP | 2003-165607 A | 6/2003 | | |
| JP | 2006-016154 A | 1/2006 | | |
| JP | 2014-47060 A | 3/2014 | | |

OTHER PUBLICATIONS

Chinese Search Report Issued on Apr. 7, 2023 with respect to counterpart Chinese patent application 202210325090.6.

Translation of Chinese Search Report issued on Apr. 7, 2023 with respect to counterpart Chinese patent application 202210325090.6.

\* cited by examiner

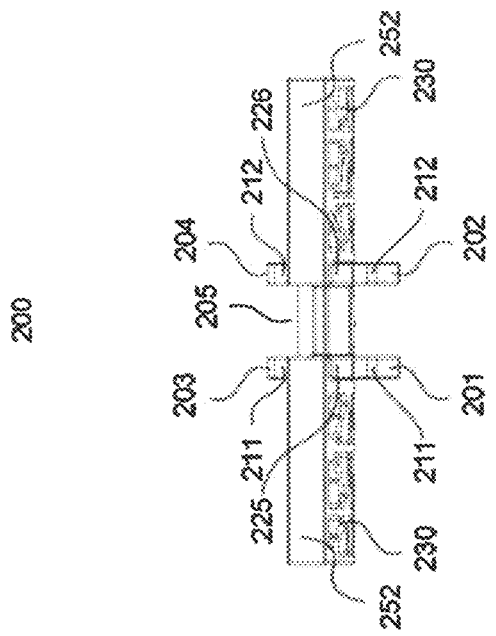
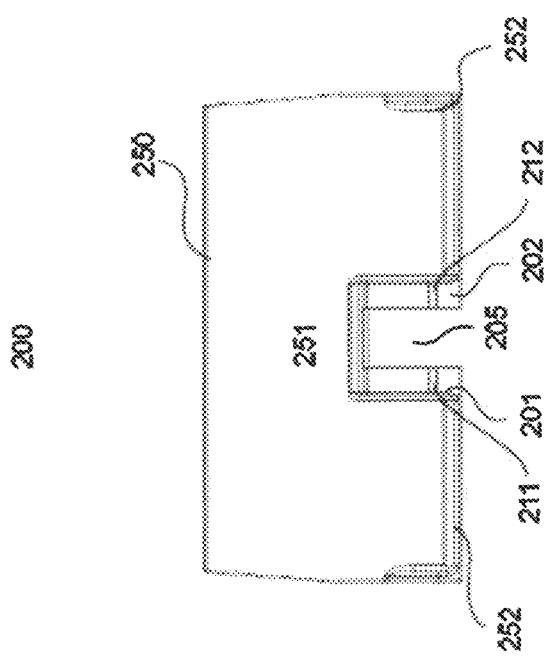
Fig. 3a
Fig. 3b

GRAIN CONVEYOR CHAIN

CROSS-REFERENCES TO RELATED APPLICATIONS

This application claims the benefit of prior filed U.S. provisional Application No. 63/168,754, filed Mar. 31, 2021, pursuant to 35 U.S.C. 119(e).

BACKGROUND OF THE INVENTION

The invention relates to a grain conveyor chain for a harvesting vehicle.

Harvesting machines, for example combine harvesters, have conveyor chains, which convey the harvested and threshed material, for example grain, from the screw conveyor in the lower region of the harvesting machine into the grain tank in the upper region of the harvesting machine (also grain conveyor chain or elevator chain). For this purpose, an endless chain provided with scoops runs between two sprockets in an elevator housing, which has an upward section and a return section. Due to the constant use of agricultural machinery outdoors, these conveyor chains are exposed to both weather-related influences and dust and dirt.

To date, grain conveyor chains have the disadvantage that in addition to the conveyor scoop, an additional element (the bracket) is required for fastening the conveyor scoop on the chain. The weight and the production costs of the conveyor chain are thus increased, in case of damage, the conveyor chain is complex to service.

It would therefore be desirable and advantageous to provide an improved grain conveyor chain for a harvesting vehicle to obviate prior art shortcomings and to attain higher conveyed quantity of harvested grain per unit of time, while yet being cost-effective, reliable in operation, cost-effective to produce, and easy to maintain.

It would also be desirable and advantageous to provide an improved scoop and method for fastening a scoop on a grain conveyor chain to obviate prior art shortcomings.

SUMMARY OF THE INVENTION

According to one aspect of the present invention, a scoop includes a scoop body having a scoop surface. The scoop surface is designed to accommodate the material to be transported. Furthermore, the scoop has a fastening element, which is provided and suitable for the purpose of being fastened directly on a standard chain element. Directly fastened in the meaning of this document refers to fastenings which manage without adapters or additional parts, for example angled plates, as are typically used in these applications. The fastening elements of the scoops are thus in direct contact with one or more standard chain elements.

According to another advantageous feature of the invention, the scoop additionally can include two flanks which enclose the chain over the outer plates of the chain. The distance of the flanks from one another is dimensioned in such a way that the flanks directly abut the chain, in particular an outer plate. Therefore, there is no space between chain and scoop, and the conveyed grain cannot get between chain and scoop in operation. Furthermore, the depth of the flanks corresponds to the height of the grain conveyor chain, so that the chin formed by the rear side of the chain facing away from the scoop terminates with the edges of the flanks of the scoop extending in parallel. No space thus results behind the chain, through which the crop could fail from the scoop.

According to another advantageous feature of the invention, the scoop can be formed in one piece. The scoop advantageously only has one component, or additional components are connected in a formfitting manner to the scoop. The scoop can therefore be produced by means of known methods in large-scale production, in particular if the scoop is made of a plastic. The scoop can then be produced cost-effectively, for example, by means of injection molding methods. Components are understood as one piece in the meaning of this document which only consist of one part or comprise multiple parts which are not detachably connected (for example multicomponent injection molding). In an optional refinement of the invention, the scoop is formed in one piece with the fastening element.

According to another advantageous feature of the invention, the scoop can have a fastening element, for example in the form of a fastening opening, through which a pin can be guided for fastening the scoop on a standard chain element. By means of the pin, the scoop is fastened directly on the standard chain element such as a pin or outer plate of the chain.

According to another advantageous feature of the invention, the fastening element can be arranged on one or both flanks of the scoop. Advantageously, both flanks each have a fastening element which are aligned with one another in such a way that a pin for fastening the scoop on a standard chain element of the chain can be guided through the fastening elements.

According to another advantageous feature of the invention, each flank can have two fastening elements, for example in the form of fastening openings. The fastening openings are aligned with one another in pairs in such a way that a pin can be guided through each two of the fastening openings aligned with one another, using which the scoop is fastenable on a standard chain element of the chain.

According to another advantageous feature of the invention, the fastening element can have a first reinforcement. The first reinforcement reinforces the fastening elements in such a way that a pin that can be guided through the fastening elements only has little play and the scoop is thus fastenable without play on a standard chain element of the chain by the pin.

According to another advantageous feature of the invention, the first reinforcement can be made of a different material than the scoop surface. The scoop surface is advantageously formed from a plastic which can be produced cost-effectively, for example, by means of Injection molding. To increase the service life of the fastening element, the first reinforcement is manufactured from a material which increases the strength and breakage resistance of the fastening element.

According to another advantageous feature of the invention, the first reinforcement can be made of a metal. A first reinforcement made of a metal, for example aluminum or steel, meets this requirement and is mass producible cost-effectively.

According to another advantageous feature of the invention, the first reinforcement can only include a part of the flank. To reduce weight and costs of the scoop, only the part of the flank which is subjected to the highest stresses in running operation is reinforced.

According to another advantageous feature of the invention, the first reinforcement can be a sleeve. The sleeve reinforces the fastening elements in such a way that a pin that can be guided through the fastening elements only has little play and the scoop is thus fastenable without play on a standard chain element of the chain by the pin.

According to another advantageous feature of the invention, the first reinforcement can have the form of an outer plate. In an optional refinement of the invention, the outer plate of the first reinforcement, after fastening of the scoop on the chain, replaces the outer plates of the chain link on which the scoop is fastened.

According to another advantageous feature of the invention, the reinforcement can be embedded in the fastening elements. The first reinforcement is not detachably connected to the fastening element. The scoop forms a one-piece component and can be replaced quickly in case of service.

According to another advantageous feature of the invention, the scoop can have a scoop surface reinforcement. The scoop surface reinforcement reinforces the scoop body against stresses under load in such a way that the scoop does not deform under load, and more material per unit of time can thus be conveyed, or even breaks.

According to another advantageous feature of the invention, the scoop surface reinforcement can be a support structure under the scoop surface. A support structure effectively prevents a deformation of the scoop body under load and has a low weight at the same time. The support structure can be formed by support ribs, for example. Furthermore, struts made of a different material than the scoop can be provided as the support structure. The scoop surface reinforcement can be designed in such a way that it is integrated, for example, by injection molding into the scoop during production of the scoop.

According to another advantageous feature of the invention, the scoop surface reinforcement of the scoop can be made of a different material than the scoop surface. To increase the strength and in particular breakage resistance of the scoop surface, the reinforcement is manufactured from a material which increases the strength and breakage resistance of the scoop surface.

According to another advantageous feature of the invention, the scoop surface can be made of a plastic and the scoop surface reinforcement is made of a metal. The scoop surface is advantageously made of a plastic which can be produced cost-effectively, for example, by means of injection molding. To increase the strength and in particular breakage resistance of the scoop surface, the reinforcement is manufactured from a material which increases the strength and breakage resistance of the scoop surface.

According to another advantageous feature of the invention, the scoop can be fastened on the grain conveyor chain according to the invention. The grain conveyor chain has a chain. The chain has standard chain elements, wherein the standard chain elements have inner plates, outer plates, pins, and/or sleeves.

According to another advantageous feature of the invention, the scoop and/or the fastening means can have dimensions that correspond to the dimensions of one of the chain components, for example sleeve, pin, inner plate, and/or outer plate, and/or the chains of a standard chain according to British Standard (DIN 8188) or ANSI Standard (DIN 8187). These dimensions of the scoop and/or the fastening means can be one or more dimensions of the standard chain from the group of the following dimensions: the pin and/or sleeve diameter, the outer distance of opposite outer plates, the inner distance of opposite inner plates, the distance between two pins, the distance between two sleeves, the length of a chain link, the length of an inner plate, the length of an outer plate, or any other dimension that results from the dimensions of a standard chain according to British Standard (DIN 8188) or ANSI Standard (DIN 8187) or their chain components.

According to another aspect of the invention, a grain conveyor chain includes a chain. The chain has standard chain elements, wherein the standard chain elements have inner plates, outer plates, pins, and/or sleeves. The grain conveyor chain also has multiple scoops fastened on the chain. According to the invention, a scoop is in direct contact with a standard chain element. In particular, the scoops are fastened on the chain and in direct contact with a standard chain element such that there is no space between the chain and the scoop. This effectively prevents the material being transported on the scoop from falling during operation, and the grain conveyor chain according to the invention operates more efficiently.

According to another advantageous feature of the invention, the scoop can be fastened directly on a standard chain element. The scoop therefore does not require a further bracket or spacer to fasten it on the chain. Due to the direct fastening of the scoop on a standard chain element, the grain conveyor chain according to the invention can be produced more easily and with less effort than previously known conveyor chains. The grain conveyor chain according to the invention can therefore be operated more efficiently.

According to another advantageous feature of the invention, the scoop can be fastened on the chain by means of a pin directly on the outer plate. The pin can be designed in such a way that the pin both fastens the scoop and at the same time serves as a chain pin. Therefore, no additional components are required to fasten the scoop on the chain, the grain conveyor chain is lighter than comparable grain conveyor chains and is additionally producible more cost-effectively.

According to another advantageous feature of the invention, the scoop can have a fastening element which is used to fasten the scoop on the standard chain element. Optionally, the fastening element can be an opening through which a pin is guided, by which the scoop is fastened directly on a standard chain element of the chain, for example the outer plate and/or inner plate and the pin.

According to another advantageous feature of the invention, the pin as a chain pin can represent a joint between an inner plate and an outer plate of the chain. The pin is arranged in such a way that the scoop is held perpendicular to the chain is running operation in the upward region (load side) by its own weight and the material transported on the scoop surface.

According to another advantageous feature of the invention, each scoop can be fastened on the chain by means of two pins. This makes the chain-scoop connection more stable, the pins serve at the same time as chain pins of the chain link on which the scoop is fastened. Further components for fastening the scoop on the chain are not required.

According to still another aspect of the invention, a method for fastening a scoop on a grain conveyor chain includes two method steps: In the first method step, a scoop is positioned in relation to a standard chain element of a chain. The standard chain element is an inner plate, an outer plate, a pin, and/or a sleeve, in the second method step, the scoop is fastened directly on the standard chain element of the chain. The scoop therefore does not require a further bracket or spacer to fasten it on the chain. Due to the direct fastening of the scoop on a standard chain element, the grain conveyor chain according to the invention can be produced more easily and with less effort than previously known conveyor chains. The grain conveyor chain according to the invention can therefore be operated more efficiently. In particular, the scoops are fastened on the chain and in direct contact with a standard chain element such that there is no space between the chain and the scoop. This effectively prevents the material being transported on the scoop from falling during operation, and the grain conveyor chain according to the invention operates more efficiently.

According to another advantageous feature of the invention, the scoop can have two flanks, each having a fastening element. The scoop is fastened on the grain conveyor chain by the fastening element. The distance between the flanks is equal to the chain width and is dimensioned in such a way that the flanks directly abut the chain, in particular an outer plate. Therefore, there is no space between chain and scoop, and the conveyed grain cannot get between chain and scoop in operation.

According to another advantageous feature of the invention, the scoop can be fastened on the chain by a pin directly on an outer plate. The pin can be designed in such a way that the pin both fastens the scoop and at the same time serves as a chain Om Therefore, no additional components are required to fasten the scoop on the chain, the grain conveyor chain is lighter than comparable grain conveyor chains and is additionally producible more cost-effectively.

According to another advantageous feature of the invention, each scoop can be fastened on the chain by means of two pins. This makes the chain-scoop connection more stable, the pins serve at the same time as chain pins of the chain link on which the scoop is fastened. Further components for fastening the scoop on the chain are not required.

According to another advantageous feature of the invention, the scoop can have a fastening element, through which a pin for fastening the scoop on the standard chain element is guided. The pin can be designed in such a way that the pin both fastens the scoop and at the same time serves as a chain pin. Therefore, no additional components are required to fasten the scoop on the chain.

According to another advantageous feature of the invention, a first reinforcement can be arranged on the fastening element. The first reinforcement reinforces the fastening element in such a way that a pin that can be guided through the fastening elements only has little play and the scoop is thus fastenable without play on a standard chain element of the chain by the pin.

According to another advantageous feature of the invention, the first reinforcement can be made of a different material than the scoop surface of the scoop. The scoop surface is advantageously formed from a plastic which can be produced cost-effectively, for example, by means of injection molding. To increase the strength and in particular breakage resistance of the scoop surface, the reinforcement is manufactured from a material which increases the strength and breakage resistance of the scoop surface.

According to another advantageous feature of the invention, the first reinforcement can be made of a metal. To increase the strength and in particular breakage resistance of the scoop surface, the first reinforcement is manufactured from a material which increases the strength and breakage resistance of the scoop surface. A first reinforcement made of a metal, for example aluminum or steel, meets this requirement and is mass producible cost-effectively.

According to another advantageous feature of the invention, the first reinforcement can only include a part of the flank. To reduce weight and costs of the scoop, only the part of the flank which is subjected to the highest stresses in running operation is reinforced.

According to another advantageous feature of the invention, a sleeve can be arranged on the fastening element as the first reinforcement. The sleeve reinforces the fastening element in such a way that a pin that can be guided through the fastening element designed as a fastening opening only has little play and the scoop is thus fastenable without play on a standard chain element of the chain by the pin.

According to another advantageous feature of the invention, the first reinforcement can be arranged in the form of an outer plate on the fastening element. After the scoop Is fastened on the chain, the first reinforcement replaces the outer plates of the chain link on which the scoop is fastened.

According to another advantageous feature of the invention, the reinforcement can be embedded in the fastening element. The first reinforcement is connected in a formatting manner to the fastening element, the scoop forms a one-piece component and can be quickly replaced in case of service.

BRIEF DESCRIPTION OF THE DRAWING

Other features and advantages of the present invention will be more readily apparent upon reading the following description of currently preferred exemplified embodiments of the invention with reference to the accompanying drawing, in which;

FIG. 3a shows a view of a further exemplary embodiment of the scoop according to the invention, upper side, FIG. 3b shows a view of a further exemplary embodiment of the scoop according to the invention.

DETAILED DESCRIPTION OF PREFERRED EMBODIMENTS

Figure 1:
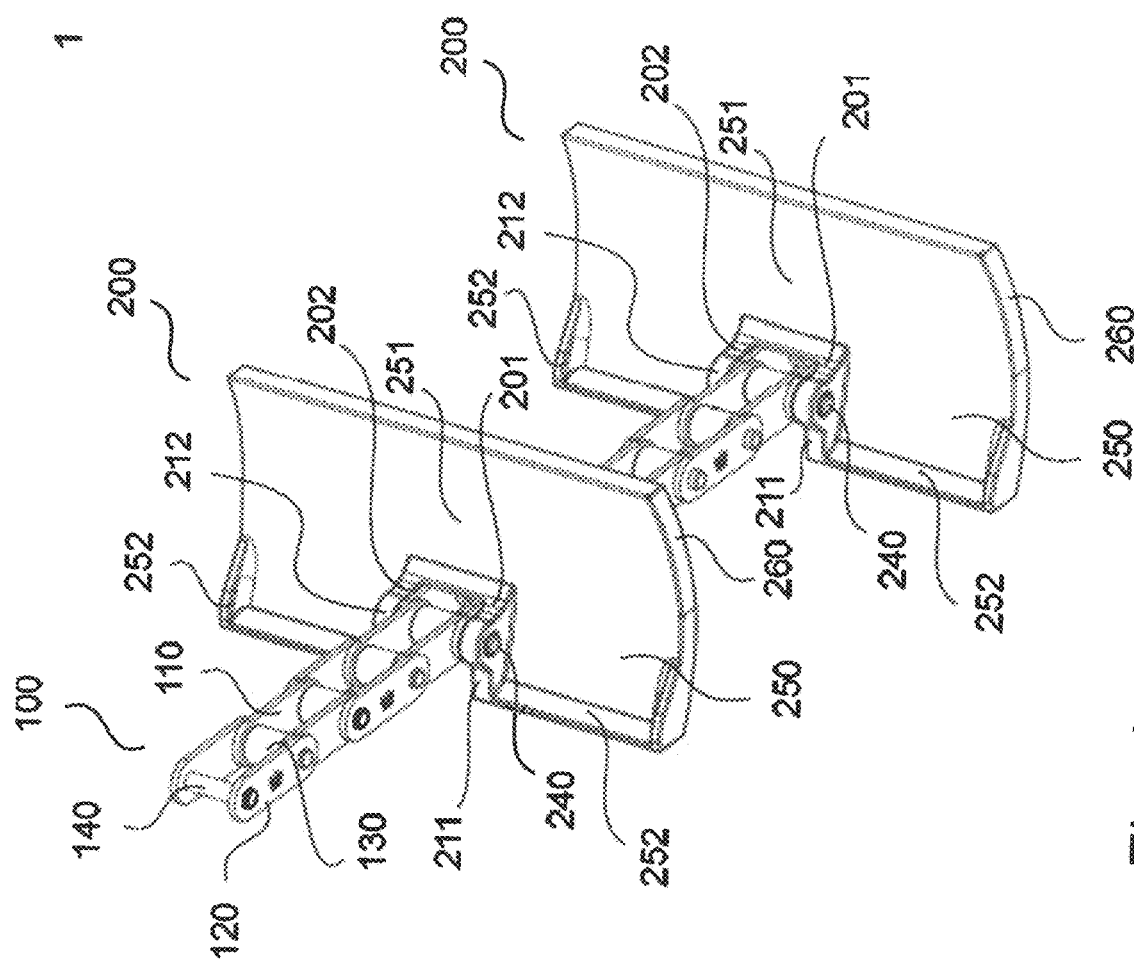
FIG. 1 shows a grain conveyor chain according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary embodiment of the grain conveyor chain 1 according to the invention. The grain conveyor chain 1 is typically a circulating endless chain, in this and the following figures, only one region of the grain conveyor chain 1 is shown. The grain conveyor chain 1 has the chain 100. In this and the following exemplary embodiments, the chain 100 is designed as a roller chain having standard chain elements. The standard chain elements are alternating inner 110 and outer plates 120, which are connected to one another by chain pins 140 guided in chain sleeves (not shown). The rotatable rollers 130 enclose the chain sleeves and chain pins 140 and are operatively connected to the drive means, for example a sprocket (not shown).

A plurality of scoops 200 are fastened on the chain 100, of which two scoops 200 fastened on the chain spaced apart from one another are shown as an example in this FIG. In this exemplary embodiment, the scoop 200 is fastened directly on the outer plates 120 of the chain 100 using a pin 240, For this purpose, the scoop 200 has two flanks 201, 202, each of which has a fastening element 211, 212. The fastening elements shown here are fastening openings having an inner diameter equal to the outer diameter of the pin 240. The flanks extend above 201, 202 and below 203, 204 the scoop surface 250. The fastening elements 211, 212 are aligned with one another. The pin 240 has the same diameter as a chain pin 140, but at the same time it has a greater length.

In order to fasten the scoop 200 on the chain 100, the scoop 200 is positioned in such a way that the fastening openings 211, 212 are aligned with the openings of each two opposing outer plates 120 and inner plates 110 and a chain sleeve. The pin 240 is then guided through the fastening elements 211, 212, the outer plates 120 and inner plates 110, and the chain sleeve in such a way that the pin 240 both fastens the scoop 200 on the chain 100 and functions as a chain pin 140, In the fastened state, the scoop 200 is pivotable around the pin 240 as the joint axis. In running operation, the scoop 200 in the load side of the chain 100 is pressed against the chain 100 by its own weight and the weight of the material transported on the scoop surface 250 and is thus held essentially perpendicular to the chain 100.

The chain 100 is a standard chain according to British Standard (DIN 8188). The scoops 200 having the fastening elements 211, 212 are formed in one piece. The inner distance between the fastening elements 211, 212 corresponds to the width of the standard chain (outer distance of the outer plates). The diameter of the holes in the fastening elements 211, 212 corresponds to the outer diameter of the pins. In an alternative embodiment (not shown here), the chain 100 is a standard chain according to the ANSI standard (DIN 8187). The dimensions of the one-piece scoop correspond here accordingly to the chain according to the ANSI standard (DIN 8187).

Different views of a scoop 200 are shown in FIGS. 2a-2d, Each scoop 200 is rectangular in shape and has the scoop surface 250 on the upper side of the scoop body 260 (FIG. 2a) for transporting the grain or other material. The scoop surface 250 has a depression 251 for better transport of the material.

In the rear region, the scoop 200 has an elevation 252 which prevents the transported material from falling off. At the same time, the elevation 252 increases the structural integrity of the scoop 200. The scoop body 260 is advantageously made of a material producible in large quantities, for example a polymer. A recess 205 is also arranged in the middle in the rear region. The recess 205 is dimensioned in such a way that it encloses the chain 100 in the state installed on the chain 100. The flanks 201, 202, 203, 204, which each have two fastening elements 211, 212, 213, 214, are arranged on the opposite sides of the recess 205. Each two opposing fastening elements 211, 212, 213, 214 are aligned with one another.

Figure 2B:
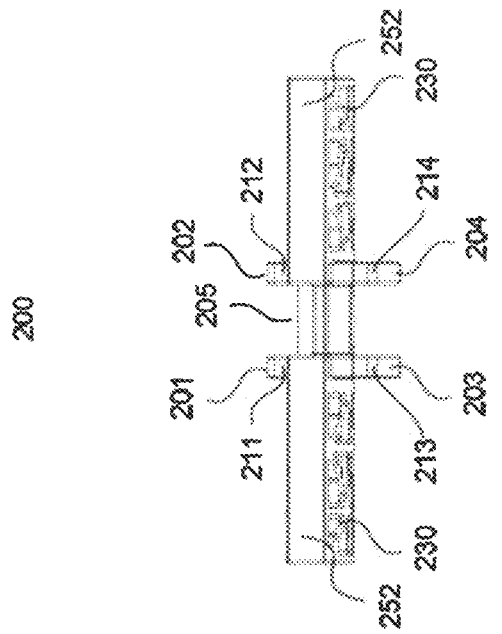
FIG. 2b shows a view of the scoop according to the invention.
Figure 2A:
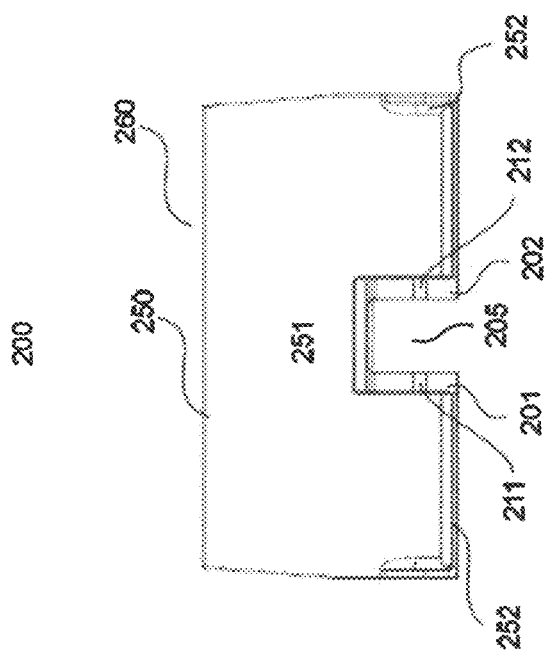
FIG. 2a; shows a view of the scoop according to the invention, upper side.
Figure 2C:
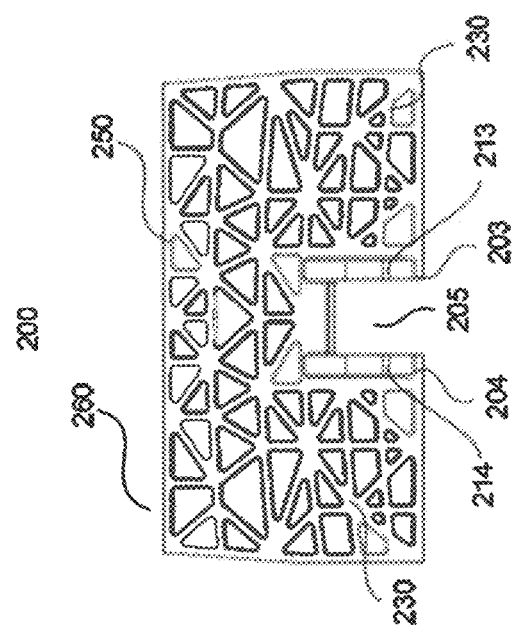
FIG. 2c shows a view of the scoop according to the invention, lower side.

The scoop 200 has a scoop surface reinforcement 230 on the lower side (FIG. 2c). This scoop surface reinforcement 230 is designed as a support structure and effectively prevents deformation or breakage of the scoop 200 under load. The reinforcement 230 can be made entirely or partially from a different material than the scoop body 260; a metal, for example in the form of aluminum struts, is advantageously used.

Figure 2D:
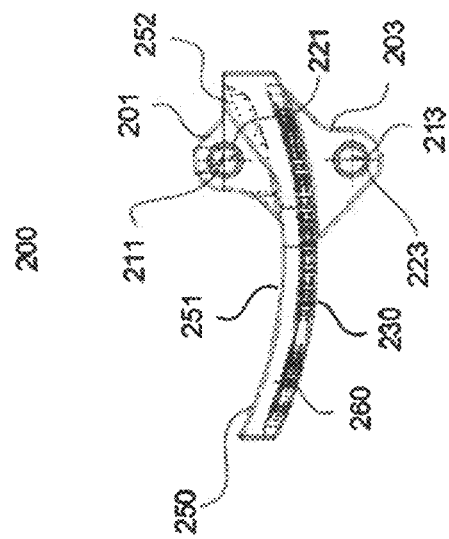
FIG. 2d shows a view of the scoop according to the invention.
Figure 3D:
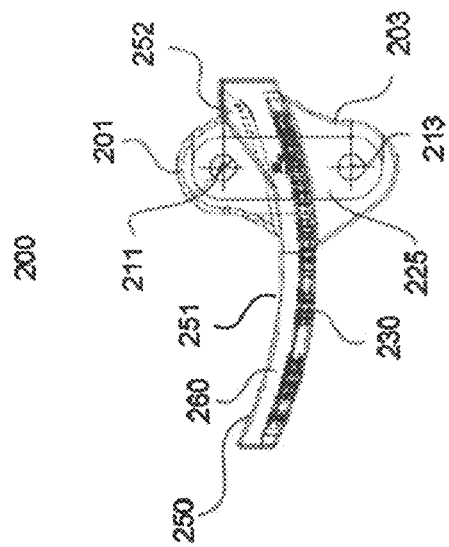
FIG. 3d shows a view of a further exemplary embodiment of the scoop according to the invention.
Figure 3C:
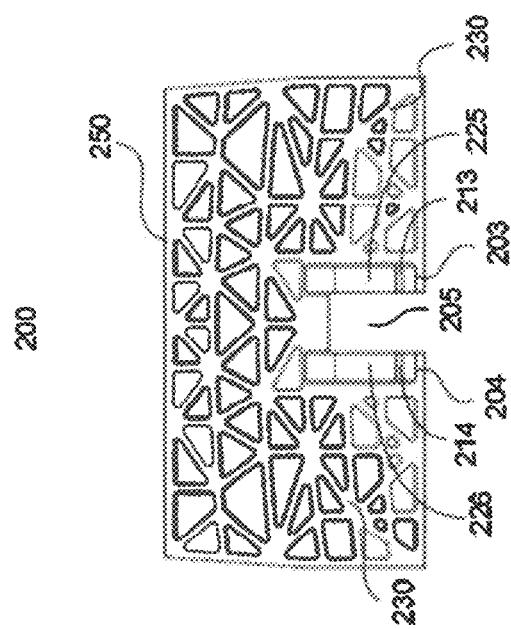
FIG. 3c shows a view of a further exemplary embodiment of the scoop according to the invention, lower side.

In this exemplary embodiment (FIG. 2b), the scoop 200 also has flanks 203, 204 on the lower side, which, like the flanks 201, 202 on the upper side of the scoop 200, have fastening elements 213, 214 aligned with one another. FIG. 2d shows the scoop in its side view. The fastening elements 211, 213 each have a first reinforcement 221, 223. These first reinforcements 221, 223 are advantageously metal sleeves, which are inserted into the fastening elements 211, 213 with a precise fit and in a form-fitting manner and are connected to them.

To fasten the scoop 200 on the chain 100, the scoop 200 is positioned in such a way that the fastening elements 211, 212 are aligned with one chain sleeve 130 and the fastening elements 213, 214 with another chain sleeve 130. A first pin 241 is then guided through the fastening elements 211, 212 and the chain sleeve 130, a second pin 242 is guided through the fastening elements 213, 214. Thus, two pins 241, 242 fasten the scoop 200 directly on the chain 100, both pins 241, 242 are at the same time chain pins of the chain 100.

FIGS. 3a to 3d show different views of an exemplary embodiment of a scoop 200 having a first reinforcement 225 in the form of an outer plate. Flanks 201, 202, 203, 204, each of which has two fastening elements in the form of fastening openings 211, 212, 213, 214, are also arranged around the recess 205 on the upper side (FIG. 3a) and lower side (FIG. 3c) of the scoop 200. The fastening openings 211, 212, 213, 214 are aligned in pairs with one another. In this exemplary embodiment, the flanks 201, 203, 202, 204 have recesses 225, 226 in the form of a chain outer plate 120 of the chain 100, into which an outer plate 120 is inserted, pressed, or embedded during the production process of the scoop 200. The scoop 200 can therefore be arranged on the chain instead of the chain outer plates 120 or in addition to the chain outer plates 120, wherein the pins 241, 242 serve at the same time as chain pins of the chain 100 for the chain link, on which the scoop 200 is fastened. The corresponding chain outer plates 120 are then omitted for this chain link. It is also possible to fasten the scoop 200 on the chain 100, wherein the flanks 201, 203, 202, 204 enclose recesses 225, 226 in the form of chain outer plates 120, the chain outer plates 120 of the chain link on which the scoop 200 is arranged.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A scoop to be installed on a grain conveyor chain for a harvesting vehicle, said scoop comprising:
   a scoop body having a scoop surface; and a flank formed as one piece with the scoop and comprising a fastening element having a first reinforcement made of a material which is different than a material of the scoop surface and a fastening opening through which a pin for fastening the scoop directly on a standard chain element is guided.

2. The scoop of claim 1, wherein the scoop has two opposing flanks and the fastening element is arranged on one of the two opposing flanks or on both of the two opposing flanks.

3. The scoop of claim 1, wherein the flank has two fastening elements.

4. The scoop of claim 1, wherein the first reinforcement is made of a metal.

5. The scoop of claim 1, wherein the first reinforcement comprises only part of the flank.

6. The scoop of claim 1, wherein the first reinforcement is a sleeve inserted or embedded in the fastening opening.

7. The scoop of claim 1, further comprising a scoop surface reinforcement as a support structure under the scoop surface.

8. The scoop of claim 7, wherein the scoop surface reinforcement is made of a material which is different than a material of the scoop surface.

9. The scoop of claim 7, wherein the scoop surface is made of a plastic and the scoop surface reinforcement is made of a metal.

10. A grain conveyor chain for a harvesting vehicle, comprising:
    a chain including standard chain elements, said standard chain elements including inner plates, outer plates, pins, or chain sleeves; and
    multiple scoops fastened on the chain, each scoop comprising a flank formed as one piece with the scoop and comprising a fastening element with a first reinforcement made of a material which is different than a material of the scoop surface and a fastening opening through which a pin configured for fastening the scoop directly on the standard chain element is guided.

11. The grain conveyor chain of claim 10, wherein the pin and a chain sleeve represent a joint between an inner plate and an outer plate of the chain.

12. The grain conveyor chain of claim 10, wherein each scoop is fastened on the chain by means of two pins.

13. A method for fastening a scoop on a grain conveyor chain, said method comprising:
    positioning a scoop in relation to a standard chain element of a chain, wherein the standard chain element includes an inner plate, an outer plate, or a sleeve, wherein the scoop has a scoop body with a scoop surface and a flank with a fastening element formed as one piece with the scoop and having a fastening opening and a first reinforcement made of a material which is different than a material of the scoop surface; and
    fastening the scoop directly on the standard chain element of the chain by guiding a pin through the fastening opening and the standard chain element.

14. The method of claim 13, wherein the scoop has two opposing flanks, each having a fastening element.

15. The method of claim 13, wherein each scoop is fastened on the chain by means of two pins.

16. The method of claim 13, wherein the first reinforcement is made of a metal.

17. The method of claim 13, wherein the first reinforcement comprises a sleeve inserted in the fastening opening.

18. The method of claim 13, wherein the grain conveyor chain comprises multiple scoops fastened on the chain, each scoop being fastened directly on the standard chain element of the chain by guiding a pin through a respective fastening element and a respective standard chain element.

* * * * *